(12) United States Patent
Shibutani

(10) Patent No.: US 7,436,434 B2
(45) Date of Patent: Oct. 14, 2008

(54) DIGITAL CAMERA AND PHOTOGRAPHING DIRECTION ACQUISITION METHOD

(75) Inventor: Atsushi Shibutani, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 608 days.

(21) Appl. No.: 10/461,766

(22) Filed: Jun. 13, 2003

(65) Prior Publication Data

US 2003/0231243 A1 Dec. 18, 2003

(30) Foreign Application Priority Data

Jun. 18, 2002 (JP) ............... 2002-176752
May 30, 2003 (JP) ............... 2003-154200

(51) Int. Cl.
*H04N 5/225* (2006.01)
(52) U.S. Cl. ................ 348/207.99; 348/376
(58) Field of Classification Search .......... 348/207.99, 348/333.02, 113, 116, 376; 701/207, 213, 701/214, 216, 220, 225
See application file for complete search history.

(56) References Cited

U.S. PATENT DOCUMENTS

| | | | | |
|---|---|---|---|---|
| 5,262,867 A * | 11/1993 | Kojima | ...................... | 348/39 |
| 5,559,554 A * | 9/1996 | Uekane et al. | ......... | 348/333.02 |
| 5,844,599 A * | 12/1998 | Hildin | ...................... | 348/14.1 |
| 5,903,706 A * | 5/1999 | Wakabayashi et al. | ...... | 386/117 |
| 5,913,078 A * | 6/1999 | Kimura et al. | ................ | 396/50 |
| 6,295,088 B1 * | 9/2001 | Tsukahara et al. | ..... | 348/333.06 |
| 6,346,980 B1 * | 2/2002 | Tani et al. | ................... | 356/4.01 |
| 6,486,910 B1 * | 11/2002 | Kaneda et al. | ......... | 348/208.99 |
| 6,573,939 B1 * | 6/2003 | Yokoyama | ................ | 348/375 |
| 6,630,958 B2 * | 10/2003 | Tanaka et al. | ......... | 348/333.06 |
| 6,741,287 B1 * | 5/2004 | Fuchimukai et al. | ........ | 348/373 |
| 6,930,715 B1 * | 8/2005 | Mower | ...................... | 348/239 |
| 6,943,839 B1 * | 9/2005 | Matsumoto et al. | ..... | 348/333.01 |
| 6,961,087 B1 * | 11/2005 | Yoshida | ................... | 348/231.1 |
| 7,027,823 B2 * | 4/2006 | Mikuni | ...................... | 455/457 |
| 2001/0055484 A1 | 12/2001 | Kochi et al. | | |
| 2002/0054223 A1 | 5/2002 | Spriggs | | |
| 2003/0103651 A1 * | 6/2003 | Novak | ....................... | 382/106 |

FOREIGN PATENT DOCUMENTS

| | | |
|---|---|---|
| EP | 1 189 021 A1 | 3/2002 |
| JP | 9-247512 A | 9/1997 |
| JP | 2000-023020 A | 1/2000 |
| JP | 2000-50195 A | 2/2000 |

* cited by examiner

*Primary Examiner*—Justin P Misleh
(74) *Attorney, Agent, or Firm*—Frishauf, Holtz, Goodman & Chick, P.C.

(57) ABSTRACT

A camera includes an image sensing unit which is arranged to be pivotal with respect to a main body unit and is used to sense an object image, an azimuth sensor which is arranged in the main body unit and is used to detect the azimuth of the facing direction of the main body unit, a pivot angle detector which detects the pivot angle of the image sensing unit with respect to the main body unit, a control unit which corrects the azimuth of the facing direction of the main body unit detected by the azimuth sensor on the basis of the pivot angle detected by the pivot angle detector, and a display unit which superimposes the correction result on a through image.

19 Claims, 9 Drawing Sheets

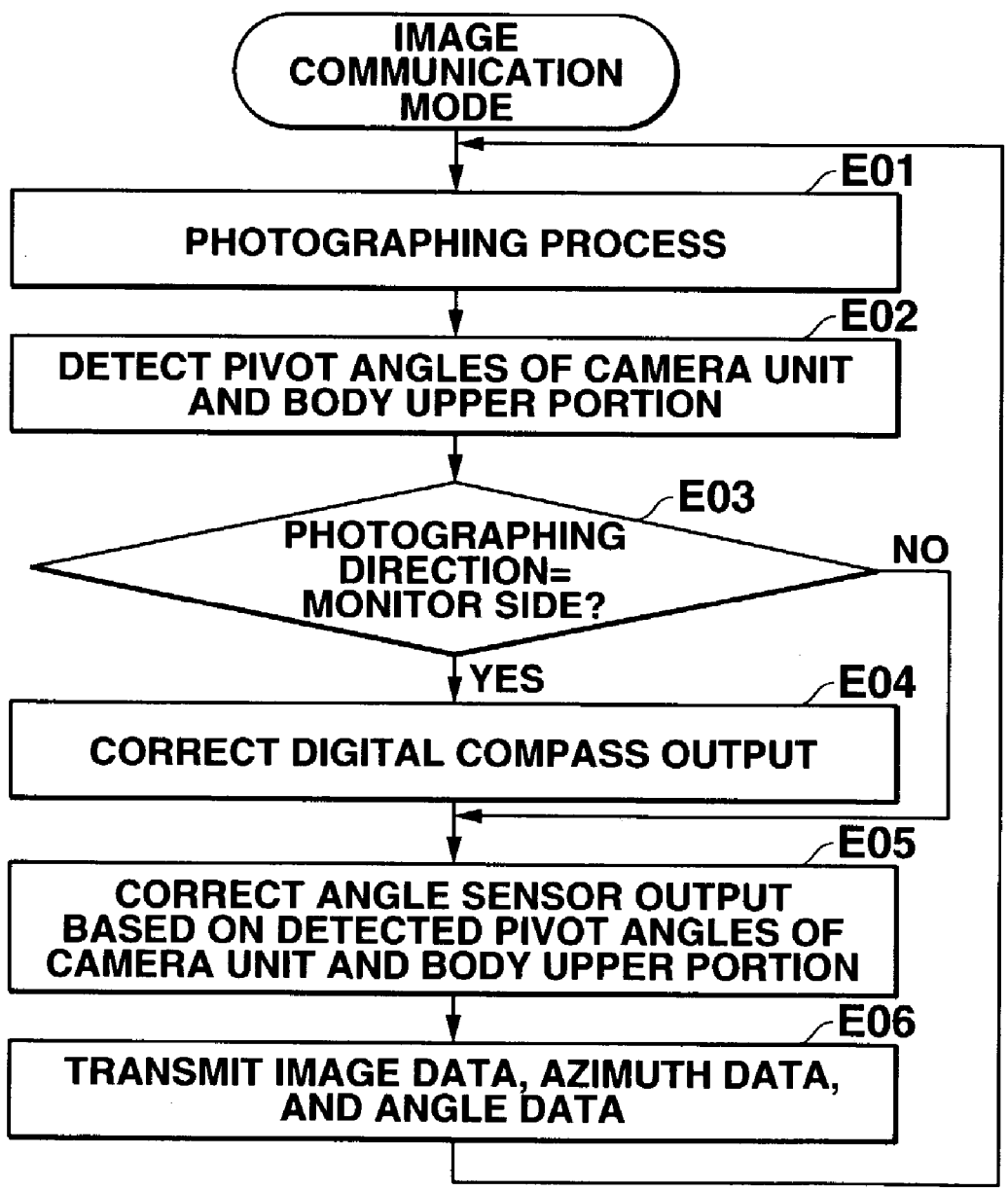

DIGITAL CAMERA AND PHOTOGRAPHING DIRECTION ACQUISITION METHOD

CROSS-REFERENCE TO RELATED APPLICATIONS

This application is based upon and claims the benefit of priority from the prior Japanese Patent Applications No. 2002-176752, filed Jun. 18, 2002; and No. 2003-154200, filed May 30, 2003, the entire contents of both of which are incorporated herein by reference.

BACKGROUND OF THE INVENTION

1. Field of the Invention

The present invention relates to a digital camera, an image sensing unit of which is pivotally provided to a main body housing, and a photographing direction acquisition method.

2. Description of the Related Art

In recent years, digital cameras which can record image data obtained by photographing on a memory card or the like as digital data have prevailed in place of silver halide cameras that use silver halide films. Not a few models of such digital cameras have an image sensing unit (camera unit) which includes a lens optical system, a CCD as an image sensing element, and the like, and is pivotally provided to the main body housing. With these models, a low-angle photographing operation while confirming the image sensing contents on a liquid crystal monitor provided to the main body housing or a photographing operation of a photographer himself or herself (self portrait) can be relatively easily executed.

Some models of digital cameras can record azimuth information acquired by an azimuth sensor as photographing azimuth information in association with image data obtained by photographing.

BRIEF SUMMARY OF THE INVENTION

According to one aspect of the present invention, there is provided a digital camera comprising an image sensing unit, arranged to be pivotal with respect to a main body unit, configured to sense an object image, a photographing direction detection unit, arranged in the main body unit, configured to detect a photographing direction, a pivot state detection unit configured to detect a pivot state of the image sensing unit with respect to the main body unit, and a correction unit configured to correct the photographing direction detected by the photographing direction detection unit on the basis of the pivot state detected by the pivot state detection unit.

According to another aspect of the present invention, there is provided a photographing direction acquisition method comprising a step of detecting a pivot state of an image sensing unit which is pivotal with respect to a main body unit, a step of detecting a photographing direction by a detector provided to the main body unit, and a step of correcting the detected photographing direction on the basis of the detected pivot state of the image sensing unit.

BRIEF DESCRIPTION OF THE SEVERAL VIEWS OF THE DRAWING

FIG. 9 is a flow chart showing the processing contents in an image communication mode according to the fourth embodiment of the present invention.

DETAILED DESCRIPTION OF THE INVENTION

First Embodiment

The first embodiment in which the present invention is applied to a digital still camera (to be simply referred to as a "digital camera" hereinafter) will be described hereinafter with reference to the accompanying drawings.

Figure 1:
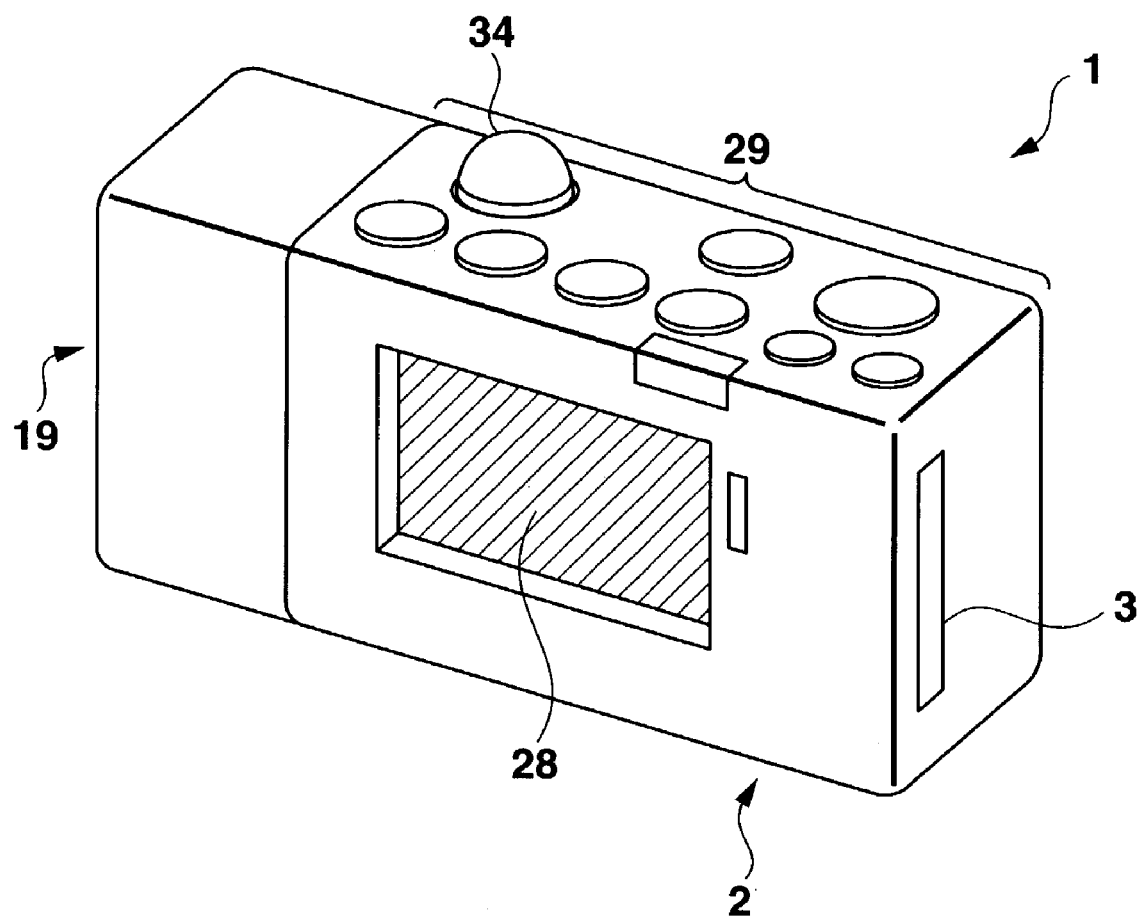
FIG. 1 is a perspective view showing the outer appearance of a digital still camera according to the first embodiment of the present invention.

Referring to FIG. 1, reference numeral 1 denotes a digital camera. The digital camera 1 is divided into a main body unit (main body housing) 2, and an image sensing unit (camera unit) 19 which is pivotally attached to the main body unit 2. A lens optical system 12 (to be described later) is attached to the front surface (on the rear surface side of the plane of FIG. 1) of the image sensing unit 19.

On the other hand, a display unit 28 used to confirm a recorded image and viewfinder image (through image) is attached to the main body unit 2. In addition, various operation buttons such as a shutter button and the like are attached as a key input unit 29 to appropriate positions on the main body unit 2.

Furthermore, a GPS antenna 34 (to be described later) is attached to the upper surface of the main body unit 2. Also, a card slot 3 that receives a memory card 31 (to be described later) is formed on the side surface of the main body unit 2.

Figure 2:
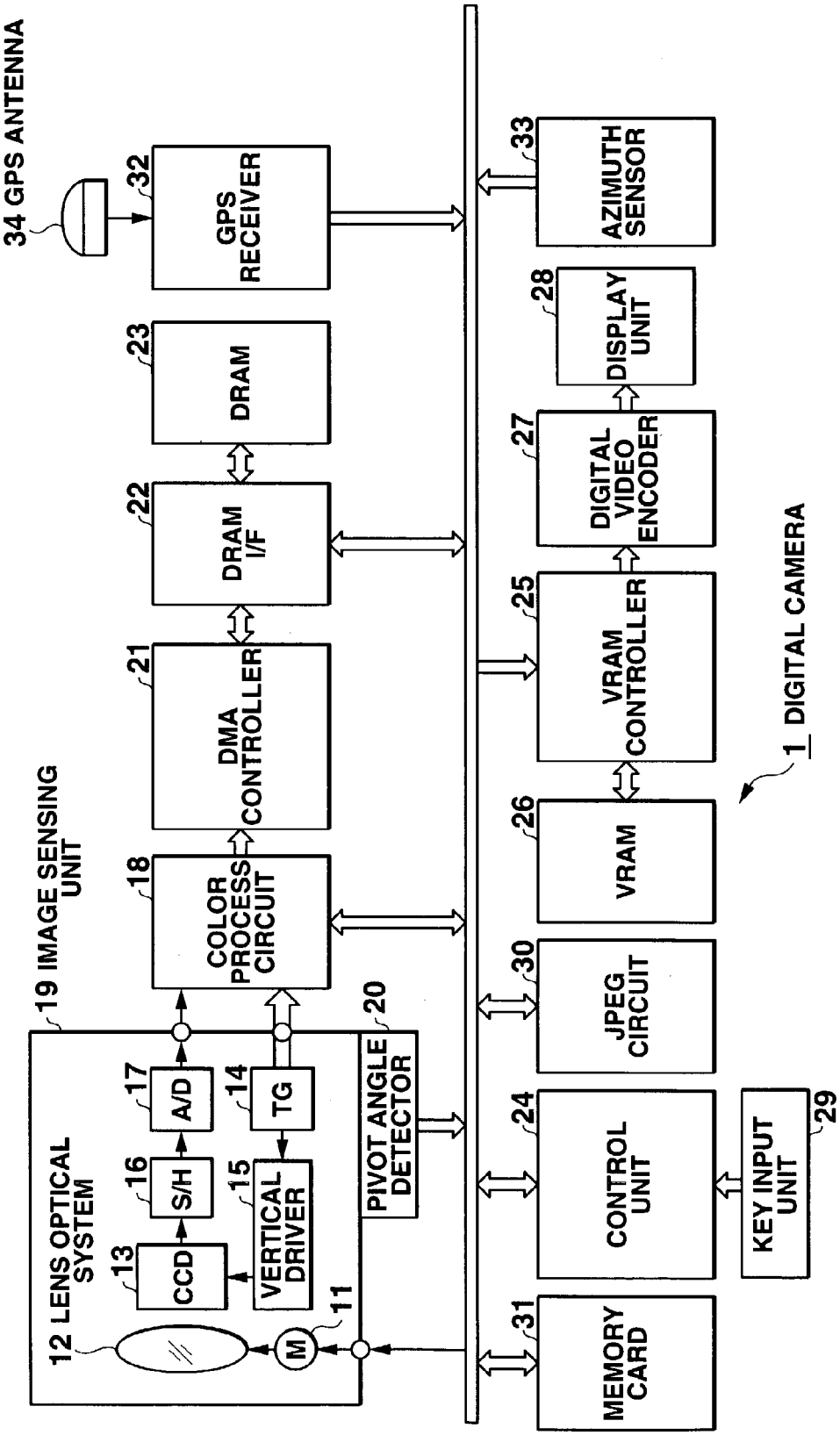
FIG. 2 is a block diagram showing the circuit arrangement of the digital still camera according to the first embodiment of the present invention.

FIG. 2 shows the circuit arrangement of the digital camera 1 shown in FIG. 1.

This digital camera 1 can selectively set a photographing mode and playback mode as a basic mode. In a monitoring state in a recording (photographing) mode, a CCD 13 as an image sensing element, which is arranged behind the photographing optical axis of the lens optical system 12, whose in-focus position and aperture position move upon driving a motor 11, is scanned and driven by a timing generator (TG) 14 and vertical driver 15, thus outputting a photoelectric conversion output corresponding to a formed optical image for one frame at given timings.

This photoelectric conversion output undergoes gain adjustment for each of R, G, and B primary color components in the state of an analog value signal. After that, the adjusted output is sampled and held by a sample/hold (S/H) circuit 16. The output from the S/H circuit 16 is converted into digital data by an A/D converter 17, and the digital data is output to a color process circuit 18.

The motor 11, lens optical system 12, CCD 13, timing generator 14, vertical driver 15, S/H circuit 16, and A/D converter 17 form the image sensing unit 19, which is pivotally provided to the main body unit 2 of the digital camera 1, as shown in FIG. 1.

That is, by manually pivoting the image sensing unit 19 along a vertical plane which vertically equally splits the main body housing when the main body housing is viewed squarely, as shown in FIG. 1, the image sensing unit 19 can face an object in front of, obliquely above, directly above, or behind the main body unit 2 and can sense its image. The pivot angle of the image sensing unit 19 with respect to the main body unit 2 is detected by a pivot angle detector 20. The detector 20 is provided to a pivot shaft portion of the image sensing unit 19 and comprises, e.g., an optical rotary encoder or the like.

The color process circuit 18 executes a color process including a pixel interpolation process and γ correction process for digital image data sent from the A/D converter 17 to generate a luminance signal Y and color difference signals Cb and Cr as digital values. The circuit 18 then outputs these signals to a DMA (Direct Memory Access) controller 21.

The DMA controller 21 temporarily writes the luminance signal Y and color difference signals Cb and Cr output from the color process circuit 18 in its internal buffer using a composite synchronization signal, memory write enable signal, and clock signal which are also sent from the color process circuit 18. Then, the controller 21 DMA-transfers the written signals to a DRAM 23 used as a buffer memory via a DRAM interface (I/F) 22.

Upon completion of DMA transfer of the luminance and color difference signals to the DRAM 23, a control unit 24 reads out these luminance and color difference signals from the DRAM 23 via the DRAM interface 22, and writes them in a VRAM 26 via a VRAM controller 25.

A digital video encoder 27 periodically reads out the luminance and color difference signals from the VRAM 26 via the VRAM controller 25. The encoder 27 generates a video signal on the basis of these data, and outputs the video signal to the display unit 28.

The display unit 28 comprises, e.g., a color liquid crystal display panel with a backlight, and its drive circuit. As shown in FIG. 1, the display unit 28 is arranged on the rear surface side of the main body unit 2 of the digital camera 1. The display unit 28 serves as a monitor display in the photographing mode. The display unit 28 makes a display based on the video signal from the digital encoder 27, thereby displaying an image based on image information captured via the VRAM controller 25 at that time.

When the user has pressed the shutter button of a plurality of keys which form the key input unit 29 at a timing he or she wants to take a still image while the display unit 28 displays an image at that time as a monitor image in real time, a trigger signal is generated.

In response to this trigger signal, the control unit 24 disengages a route from the CCD 13 to the DRAM 23 immediately after completion of DMA transfer of luminance and color difference signals for one frame, which are captured from the CCD 13 at that time, and makes a transition to a recording/save state.

In this recording/save state, the control unit 24 reads out luminance and color difference signals for one frame, which are written in the DRAM 23, in units called basic blocks having a size of 8 pixels (vertical)×8 pixels (horizontal) for each of Y, Cb, and Cr components, and writes them in a JPEG (Joint Photographic Experts Group) circuit 30. The JPEG circuit 30 compresses data by ADCT (Adaptive Discrete Cosine Transform), Huffman encoding as entropy encoding, or the like.

Then, the obtained code data are read out as a data file for one image from the JPEG circuit 30, and the data file is written in the memory card 31. The memory card 31 is detachably attached as a recording medium of the digital camera 1, and comprises a flash memory as a nonvolatile memory.

Upon completion of the compression process of the luminance and color difference signals for one frame and the write process of all compressed data in the memory card 31, the control unit 24 engages the route from the CCD 13 to the DRAM 23 again.

Note that the aforementioned pivot angle detector 20, a GPS receiver 32, and an azimuth sensor 33 are also connected to the control unit 24.

The GPS receiver 32 calculates the current position, i.e., the current latitude, longitude, and altitude, and the current time on the basis of radio waves which come from a plurality of GPS satellites and are received by a GPS antenna 34, and outputs them to the control unit 24.

The azimuth sensor 33 comprises a magnetic sensor for detecting the earth magnetism, and its processing circuit (digital compass). The azimuth sensor 33 outputs azimuth information of the facing direction of the main body unit 2 of the digital camera 1 to the control unit 24.

Note that the key input unit 29 includes a mode select key for switching the basic mode between the photographing (REC) mode and playback (PLAY) mode, a "menu" key used to display various menu items, a cross key used to instruct the up, down, right, and left directions so as to select an image or various detailed modes, to designate a selected menu item, and so forth, a "set" key arranged at the central portion of this cross key and used to set the contents selected at that time, a display key used to enable/disable a display on the display unit 28, and the like in addition to the aforementioned shutter button. Signals generated upon operations of these keys are directly output to the control unit 24.

The operation of this embodiment will be described below.

Figure 3:
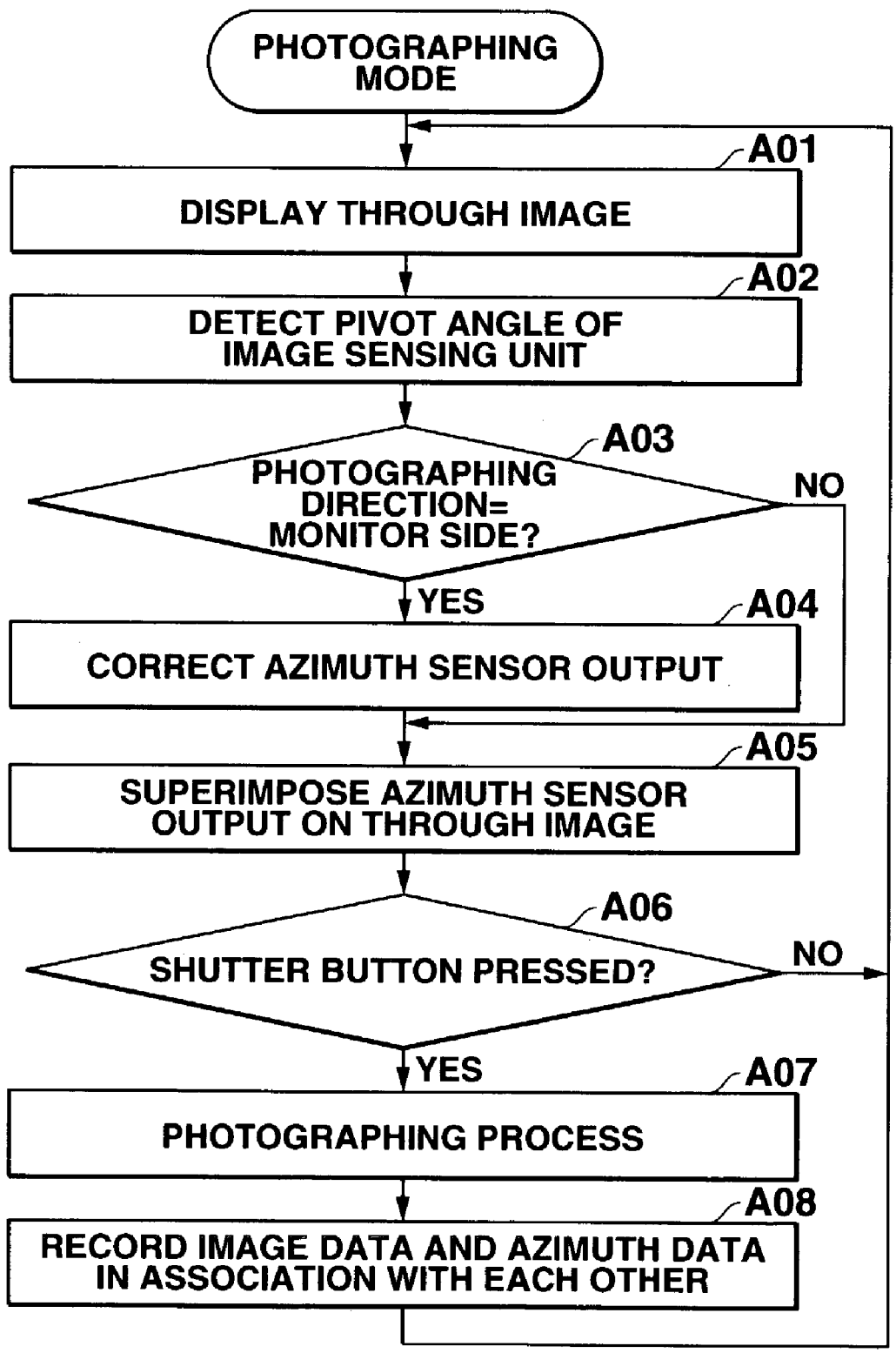
FIG. 3 is a flow chart showing an example of the processing contents in a photographing mode according to the first embodiment of the present invention.

FIG. 3 shows the processing contents to be executed by the control unit 24 while the photographing mode is selected as the basic mode.

At the beginning of this process, a through image display state that displays an image sensed by the CCD 13 on the display unit 28 intact is set (step A01). In this state, the pivot angle detector 20 detects angle information of the image sensing unit 19 with respect to the main body unit 2 (step A02). It is then checked based on the detection result if the image sensing unit 19 has been pivoted to the rear surface side of the main body unit 2 where the display unit 28 is arranged (step A03).

Only when it is determined that the image sensing unit 19 has been pivoted to the rear surface side of the main body unit 2, a process for correcting azimuth information obtained by the azimuth sensor 33 (i.e., a process for rewriting the azimuth information to a direction reversed through 180°) is executed (step A04). After that, the azimuth information obtained by the azimuth sensor 33 is superimposed on a through image displayed on the display unit 28 (step A05). In this state, it is checked if the user has pressed the shutter button of the key input unit 29 (step A06). If the shutter button has not been pressed, the flow returns to the processes from step A01.

In this way, the control waits until the shutter button is pressed while repeating the processes in steps A01 through A06, and displaying a through image on the display unit 28 together with azimuth information corrected as needed.

If it is determined in step A06 that the shutter button has been pressed, a photographing process is executed (step A07). Image data obtained from the JPEG circuit 30 is recorded on the memory card 31 in association with the azimuth information corrected as needed at that time (step A08). After that, the flow returns to the processes from step A01.

Upon displaying a through image on the display unit 28 in step A05, the azimuth information alone is superimposed on the through image. However, in practice, position information (latitude information, longitude information) at that position obtained via the GPS antenna 34 and GPS receiver 32 is also superimposed on the through image.

Upon recording data on the memory card 31 in step A08, image data is recorded in association with the azimuth information alone. However, in practice, position information at that position obtained via the GPS antenna 34 and GPS receiver 32 is also recorded in association with the image data.

In the operation of FIG. 3, as described above, azimuth information detected by the azimuth sensor 33 is always superimposed on the through image displayed on the display unit 28 after it is corrected as needed, while the control waits for depression of the shutter button. However, when the user of this digital camera 1 need not always recognize the azimuth of the facing direction of the image sensing unit 19, such superimpose display need not always be made, and the process in the standby state can be simplified.

Figure 4:
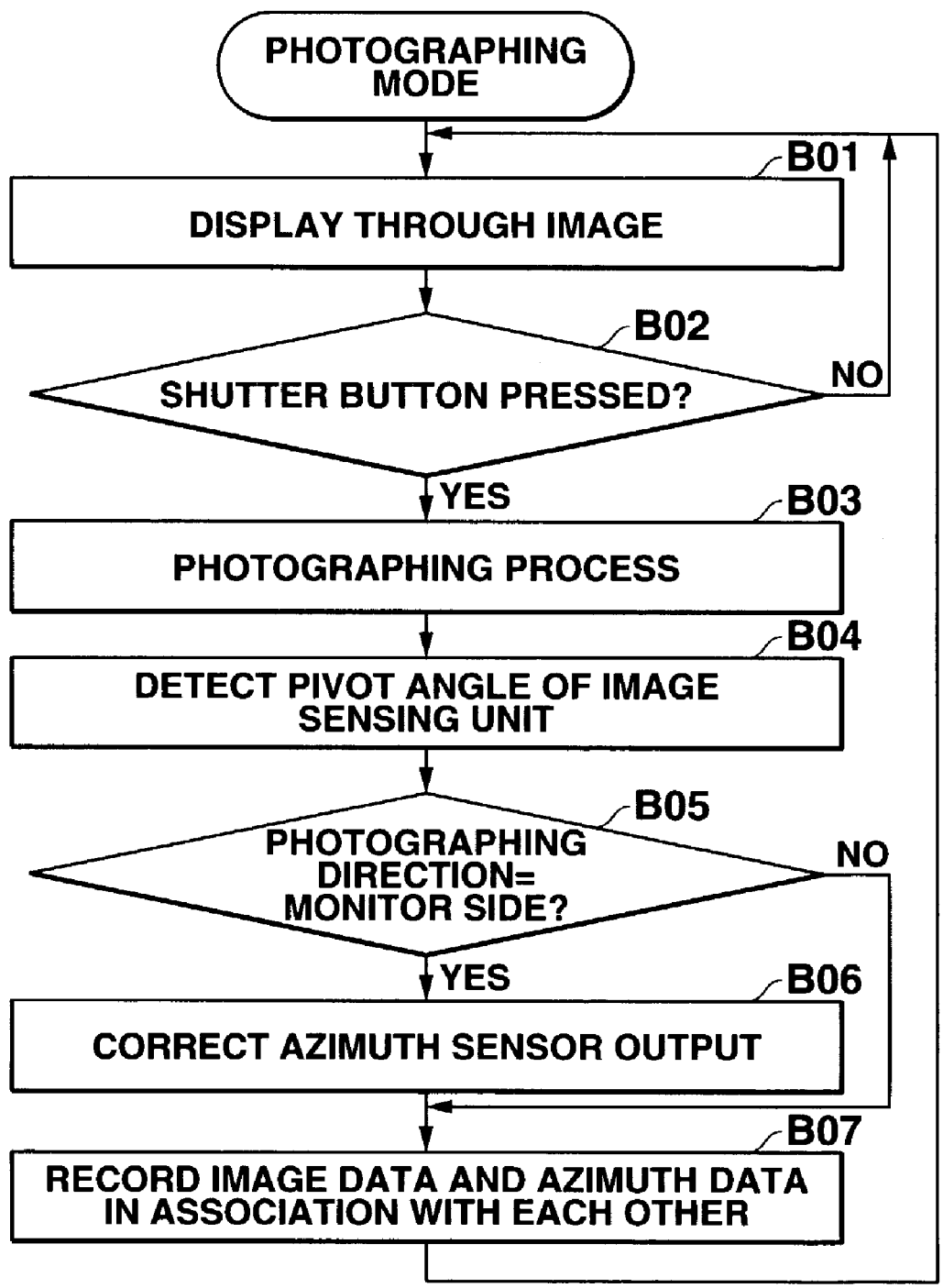
FIG. 4 is a flow chart showing another example of the processing contents in the photographing mode according to the first embodiment of the present invention.

FIG. 4 shows the processing contents of the control unit 24 in the photographing mode according to such modification of this embodiment.

In this case, at the beginning of this process, a through image display state that displays an image sensed by the CCD 13 on the display unit 28 intact is set (step B01). In this state, it is checked if the user has pressed the shutter button of the key input unit 29 (step B02). If the shutter button has not been pressed, the flow returns to the processes from step B01.

In this way, the control waits until the shutter button is pressed while repeating the processes in steps B01 and B02, and displaying a through image on the display unit 28.

If it is determined in step B02 that the shutter button has been pressed, a photographing process is executed (step B03). At the same time, the pivot angle detector 20 detects angle information of the image sensing unit 19 with respect to the main body unit 2 (step B04). It is then checked based on the detection result if the image sensing unit 19 has been pivoted to the rear surface side of the main body unit 2 where the display unit 28 is arranged (step B05).

Only when it is determined that the image sensing unit 19 has been pivoted to the rear surface side of the main body unit 2, a process for correcting azimuth information obtained by the azimuth sensor 33 (i.e., a process for rewriting the azimuth information to a direction reversed through 180°) is executed (step B06). Image data obtained from the JPEG circuit 30 is recorded on the memory card 31 in association with the azimuth information corrected as needed at that time (step B07). After that, the flow returns to the processes from step B01.

In this case as well, upon recording data on the memory card 31 in step A07, image data is recorded in association with the azimuth information alone that has been corrected as needed. However, in practice, position information at that position obtained via the GPS antenna 34 and GPS receiver 32 is also recorded in association with the image data.

In the first embodiment (FIGS. 3 and 4), whether or not the image sensing unit 19 has been pivoted to the rear surface side of the main body unit 2 where the display unit 28 is arranged is determined on the basis of the angle information detected by the pivot angle detector 20. However, a simple switch mechanism which is turned on when the image sensing unit 19 is pivoted to the rear surface side of the main body unit 2 where the display unit 28 is arranged may be provided in place of the pivot angle detector 20, thereby detecting the pivot state.

Second Embodiment

The second embodiment in which the present invention is applied to a digital still camera (to be simply referred to as a "digital camera" hereinafter) will be described hereinafter with reference to the accompanying drawings.

Since the circuit arrangement of the overall digital camera is basically the same as that shown in FIG. 2, the same reference numerals denote the same parts, and an illustration and detailed description thereof will be omitted.

The image sensing unit 19 is different from that in FIG. 1. That is, by manually pivoting the image sensing unit 19 along a horizontal plane when the main body housing is viewed squarely, the image sensing unit 19 can arbitrarily face an object in front of or on the right, back, or left side of the main body unit 2 and can sense its image. The pivot angle of the image sensing unit 19 with respect to the main body unit 2 is detected by the pivot angle detector 20. The detector 20 is provided to a pivot shaft portion of the image sensing unit 19 and comprises, e.g., an optical rotary encoder or the like.

The operation of this embodiment will be described below.

Figure 5:
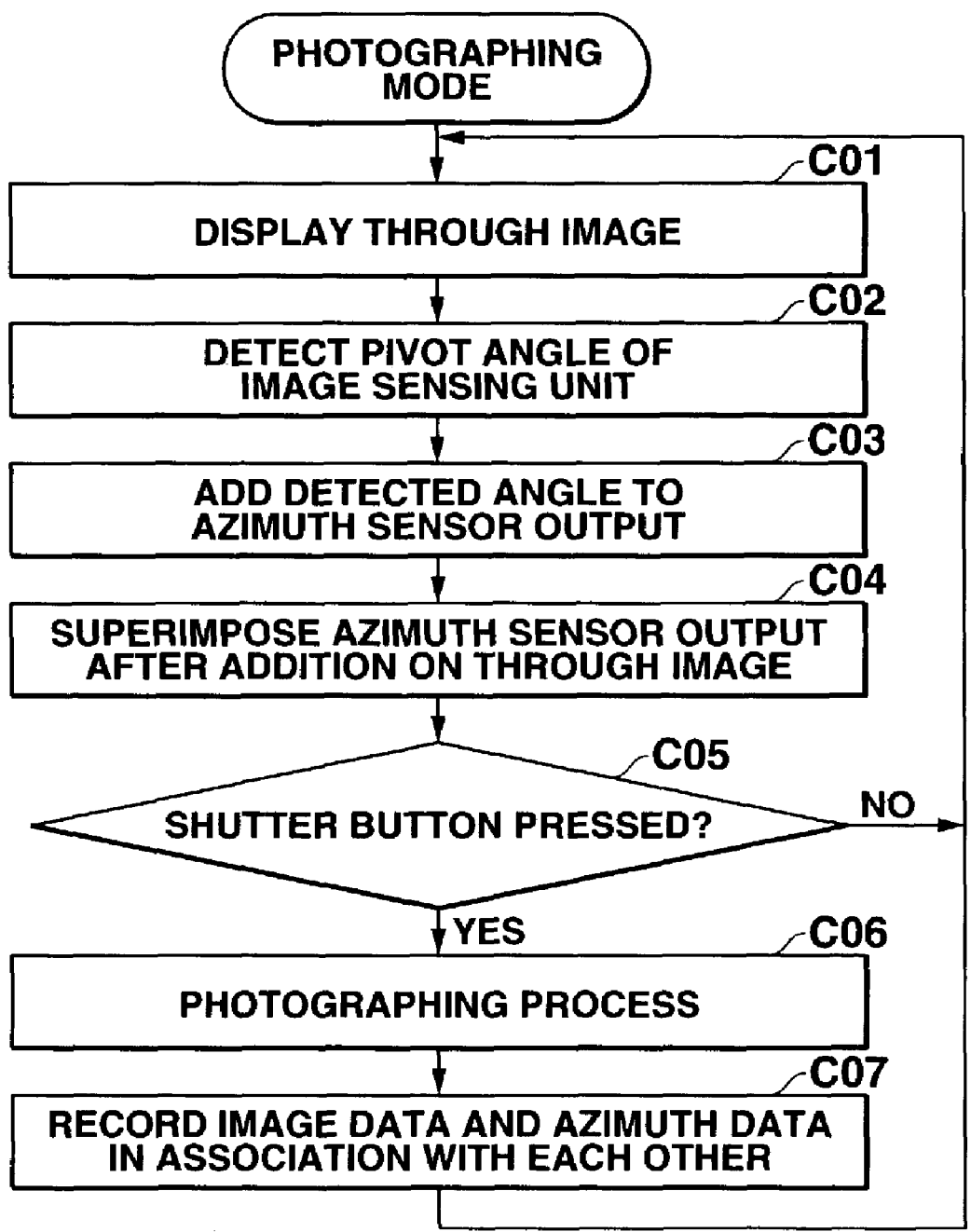
FIG. 5 is a flow chart showing the processing contents in a photographing mode according to the second embodiment of the present invention.

FIG. 5 shows the processing contents to be executed by the control unit 24 while the photographing mode is selected as the basic mode.

At the beginning of this process, a through image display state that displays an image sensed by the CCD 13 on the display unit 28 intact is set (step C01). In this state, the pivot angle detector 20 detects angle information of the image sensing unit 19 with respect to the main body unit 2 (step C02). The detection result is added to (or subtracted from) azimuth information which is detected by the azimuth sensor 33 and indicates the facing direction of the main body unit 2, thereby acquiring an accurate azimuth of the facing direction of the image sensing unit 19 by a correction calculation (step C03). When a direction perpendicular to the lens surface of the image sensing unit 19 agrees with that to the front surface of the main body unit 2, angle information detected by the pivot angle detector 20 is 0°.

The calculated azimuth information of the facing direction of the image sensing unit 19 is superimposed on a through image displayed on the display unit 28 (step C04). In this state, it is checked if the user has pressed the shutter button of the key input unit 29 (step C05). If the shutter button has not been pressed, the flow returns to the processes from step C01.

In this way, the control waits until the shutter button is pressed while repeating the processes in steps C01 through C0S, and displaying a through image on the display unit 28 together with the corrected azimuth information.

If it is determined in step C0S that the shutter button has been pressed, a photographing process is executed (step C06). Image data obtained from the JPEG circuit 30 is recorded on the memory card 31 in association with the corrected azimuth information at that time (step C07). After that, the flow returns to the processes from step C01.

Upon displaying a through image on the display unit 28 in step C04, the azimuth information alone is superimposed on the through image. However, in practice, position information (latitude information, longitude information) at that position obtained via the GPS antenna 34 and GPS receiver 32 is also superimposed on the through image.

Upon recording data on the memory card 31 in step C07, image data is recorded in association with the azimuth information alone which is corrected as needed. However, in practice, position information at that position obtained via the GPS antenna 34 and GPS receiver 32 is also recorded in association with the image data.

In the first and second embodiments, the azimuth information detected by the azimuth sensor 33 is corrected as needed, and is recorded on the memory card 31 in association with image data. Alternatively, the azimuth information may be merely superimposed during display of a through image without being recorded on the memory card 31.

When this digital camera 1 has an AF (auto-focus) function, it can calculate the distance to an object image. Hence, the position information (or information corresponding to the position information) of a location of an object image may be calculated on the basis of the current position obtained by the GPS receiver 32, (corrected) azimuth information obtained by the azimuth sensor 33, and the distance to the object image, and may be superimposed on a through image or may be recorded on the memory card 31 in association with image data.

Third Embodiment

The third embodiment in which the present invention is applied to a digital still camera (to be simply referred to as a "digital camera" hereinafter) will be described hereinafter with reference to the accompanying drawings.

Since the circuit arrangement of the overall digital camera is basically the same as that shown in FIG. 2, the same reference numerals denote the same parts, and an illustration and detailed description thereof will be omitted.

In this embodiment, the digital camera comprises an angle sensor, which detects not azimuth information (east, west, south, north) but the tilt angle of an up or down direction to which the camera faces, i.e., an elevation or depression angle, in place of the azimuth sensor 33.

In addition, the image sensing unit 19 is different from that in FIG. 1. That is, by manually pivoting the image sensing unit 19 along a horizontal plane when the main body housing is viewed squarely, the image sensing unit 19 can arbitrarily face an object in front of or on the right, back, or left side of the main body unit 2 and can sense its image. The pivot angle of the image sensing unit 19 with respect to the main body unit 2 is detected by the pivot angle detector 20. The detector 20 is provided to a pivot shaft portion of the image sensing unit 19 and comprises, e.g., an optical rotary encoder or the like.

The operation of this embodiment will be described below.

Figure 6:
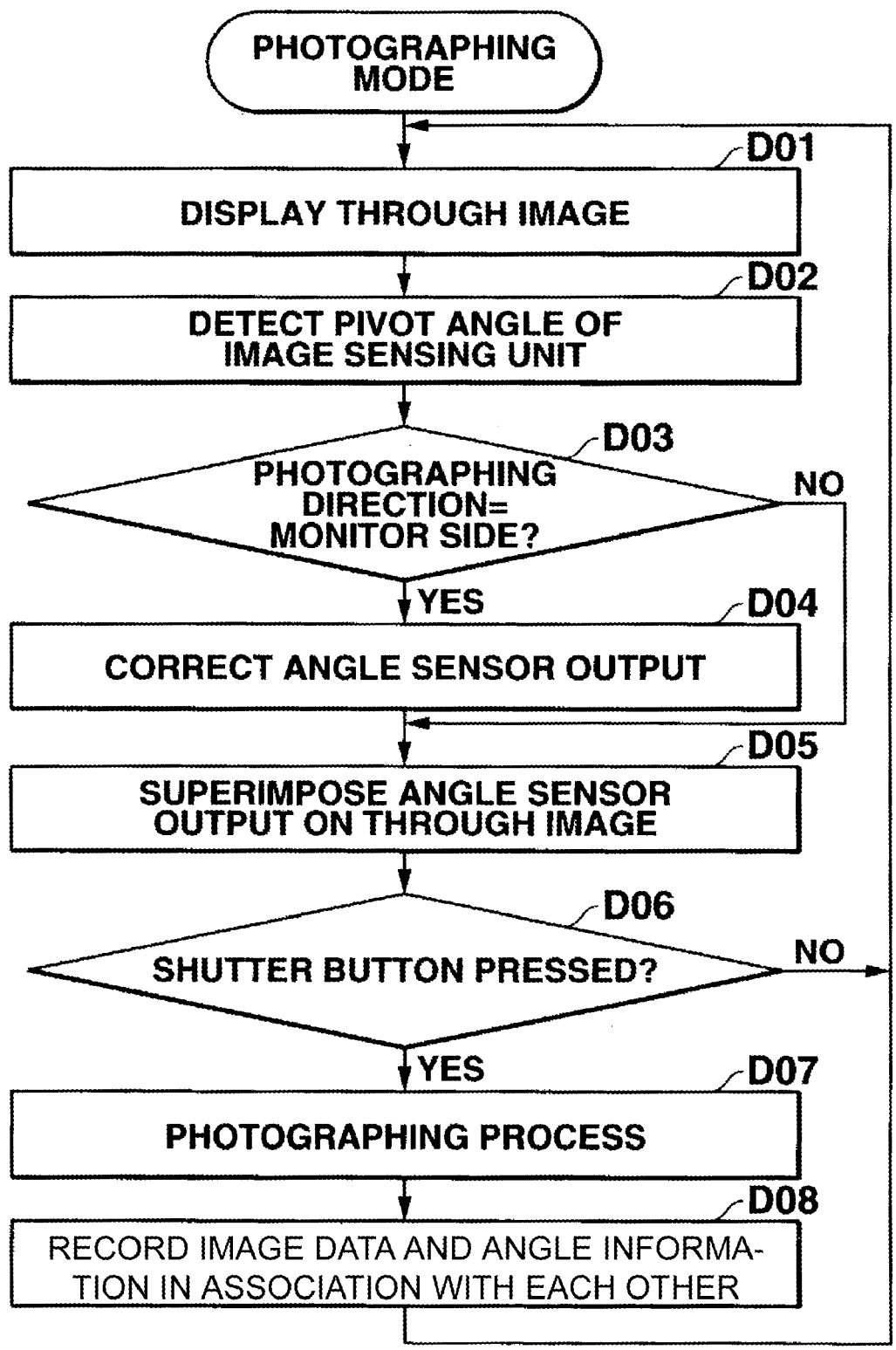
FIG. 6 is a flow chart showing the processing contents in a photographing mode according to the third embodiment of the present invention.

FIG. 6 shows the processing contents to be executed by the control unit 24 while the photographing mode is selected as the basic mode.

At the beginning of this process, a through image display state that displays an image sensed by the CCD 13 on the display unit 28 intact is set (step D01). In this state, the pivot angle detector 20 detects angle information of the image sensing unit 19 with respect to the main body unit 2 (step D02). It is then checked based on the detection result if the image sensing unit 19 has been pivoted to the rear surface side of the main body unit 2 where the display unit 28 is arranged (step D03).

Only when it is determined that the image sensing unit 19 has been pivoted to the rear surface side of the main body unit 2, a process for correcting angle information indicating the tilt angle (elevation or depression angle) obtained by the angle sensor (i.e., a process for changing the sign indicating an elevation or depression angle) is executed (step D04). After that, the angle information corrected as needed is superimposed on a through image displayed on the display unit 28 (step D05). In this state, it is checked if the user has pressed the shutter button of the key input unit 29 (step D06). If the shutter button has not been pressed, the flow returns to the processes from step D01.

In this way, the control waits until the shutter button is pressed while repeating the processes in steps D01 through D06, and displaying a through image on the display unit 28 together with angle information corrected as needed.

If it is determined in step D06 that the shutter button has been pressed, a photographing process is executed (step D07). Image data obtained from the JPEG circuit 30 is recorded on the memory card 31 in association with the angle information of the tilt angle corrected as needed at that time (step D08). After that, the flow returns to the processes from step D01.

Upon displaying a through image on the display unit 28 in step D05, the angle information alone is superimposed on the through image. However, in practice, position information (latitude information, longitude information) at that position obtained via the GPS antenna 34 and GPS receiver 32 is also superimposed on the through image.

Upon recording data on the memory card 31 in step D08, image data is recorded in association with the angle information of the tilt angle corrected as needed. However, in practice, position information at that position obtained via the GPS antenna 34 and GPS receiver 32 is also recorded in association with the image data.

In the third embodiment, whether or not the image sensing unit 19 has been pivoted to the rear surface side of the main body unit 2 where the display unit 28 is arranged is determined on the basis of the angle information detected by the pivot angle detector 20. However, a simple switch mechanism which is turned on when the image sensing unit 19 is pivoted to the rear surface side of the main body unit 2 where the display unit 28 is arranged may be provided in place of the pivot angle detector 20, thereby detecting the pivot state.

In the third embodiment, the image sensing unit 19 horizontally pivots along a horizontal plane. Alternatively, when the image sensing unit 19 is pivotal in the up or down direction to change its elevation or depression angle along a vertical plane as in the first embodiment, the accurate tilt angle information of the facing direction of the image sensing unit 19 can be calculated by simply adding or subtracting the angle detected by the pivot angle detector 20 to or from the tilt angle of the main body unit 2, as has been explained in the second embodiment.

Fourth Embodiment

The fourth embodiment in which the present invention is applied to a cellular phone with a camera (to be simply referred to as a "cellular phone" hereinafter) will be described hereinafter with reference to the accompanying drawings. In this embodiment, a cellular phone of the CDMA (Code Division Multiple Access) system will be exemplified.

Figure 7:
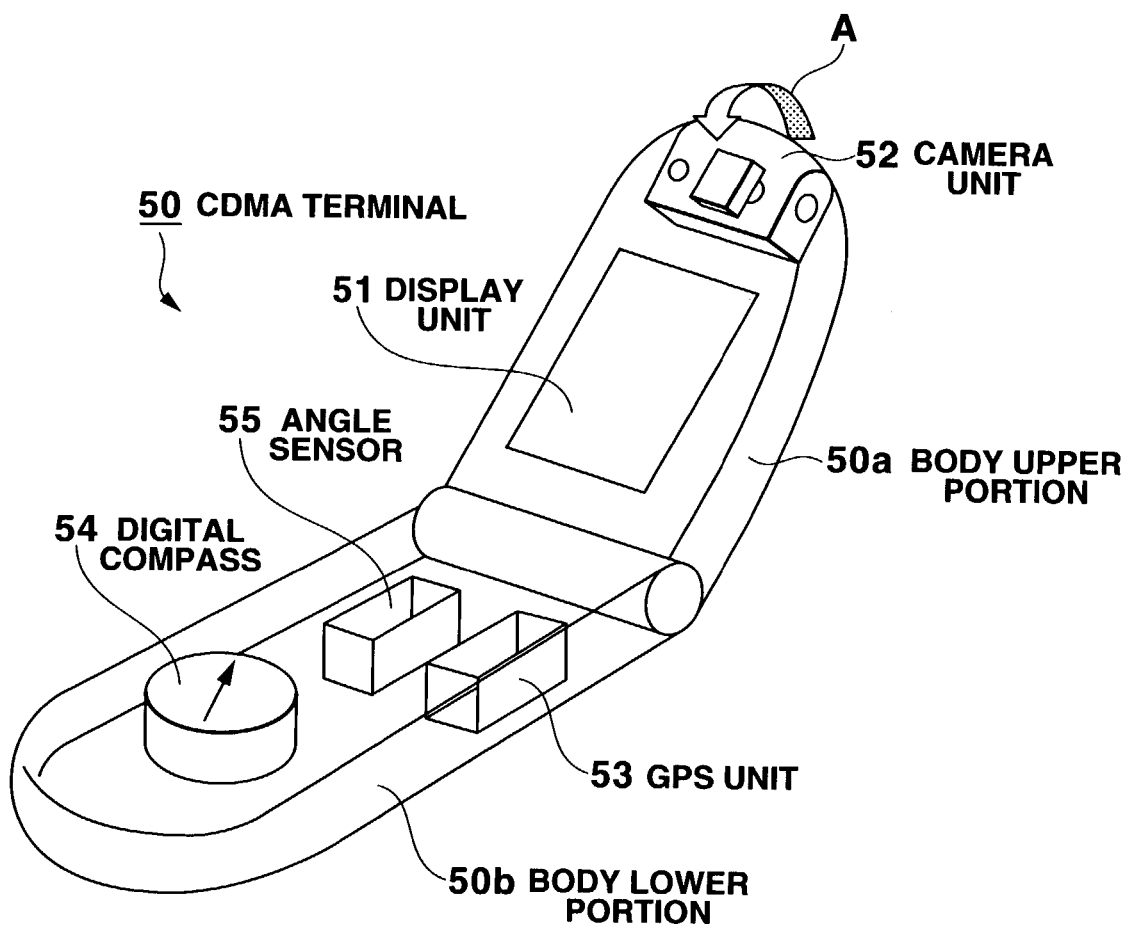
FIG. 7 is a perspective view of the outer appearance of a cellular phone with a camera according to the fourth embodiment of the present invention.

FIG. 7 selectively illustrates only a characteristic schematic arrangement when the cover of a flip type cellular phone 50 of the user is open. In FIG. 7, a display unit 51 comprising a TFT color liquid crystal panel with a backlight is provided to the inner surface of a body upper portion 50a. Also, a camera unit 52, which is pivotal to change its image sensing direction, as indicated by arrow A, is disposed on the upper end portion of the body upper portion 50a.

On the other hand, a body lower portion 50*a* incorporates a GPS unit 53, digital compass 54, and angle sensor 55. The digital compass 54 is used to obtain information of a photographing azimuth (pan angle) of the facing direction of the camera unit 52. The angle sensor 55 is used to obtain information of a photographing angle (tilt angle) in the height direction to which the camera unit 52 faces.

Since the cellular phone 50 is of flip type, and the camera unit 52 is pivotal, as described above, the camera unit 52 can be adjusted to an easy-to-photograph angle or the display unit 51 can be adjusted to an easy-to-view angle by pivoting the body upper portion 50*a* with respect to a body lower portion 50*b* or by pivoting the camera unit 52 with respect to the body upper portion 50*a* in accordance with the use state, photographing environment, and the like at that time.

In this way, when the camera unit 52 and body upper portion 50*a* are pivotal, since the digital compass 54 used to obtain the photographing azimuth and the angle sensor 55 used to obtain the photographing angle are built not in the body upper portion 50*a* (camera unit 52) but in the body lower portion 50*b*, an actual photographing azimuth does not match that obtained by the digital compass 54 or an actual photographing angle does not match that obtained by the angle sensor 55 depending on the pivot state.

Hence, in order to always obtain accurate photographing azimuth and angle, the pivot states of the camera unit 52 and body upper portion 50*a* are detected, and the photographing azimuth information obtained by the digital compass 54 or the photographing angle information obtained by the angle sensor 55 must be corrected in accordance with the detection results.

Figure 8:
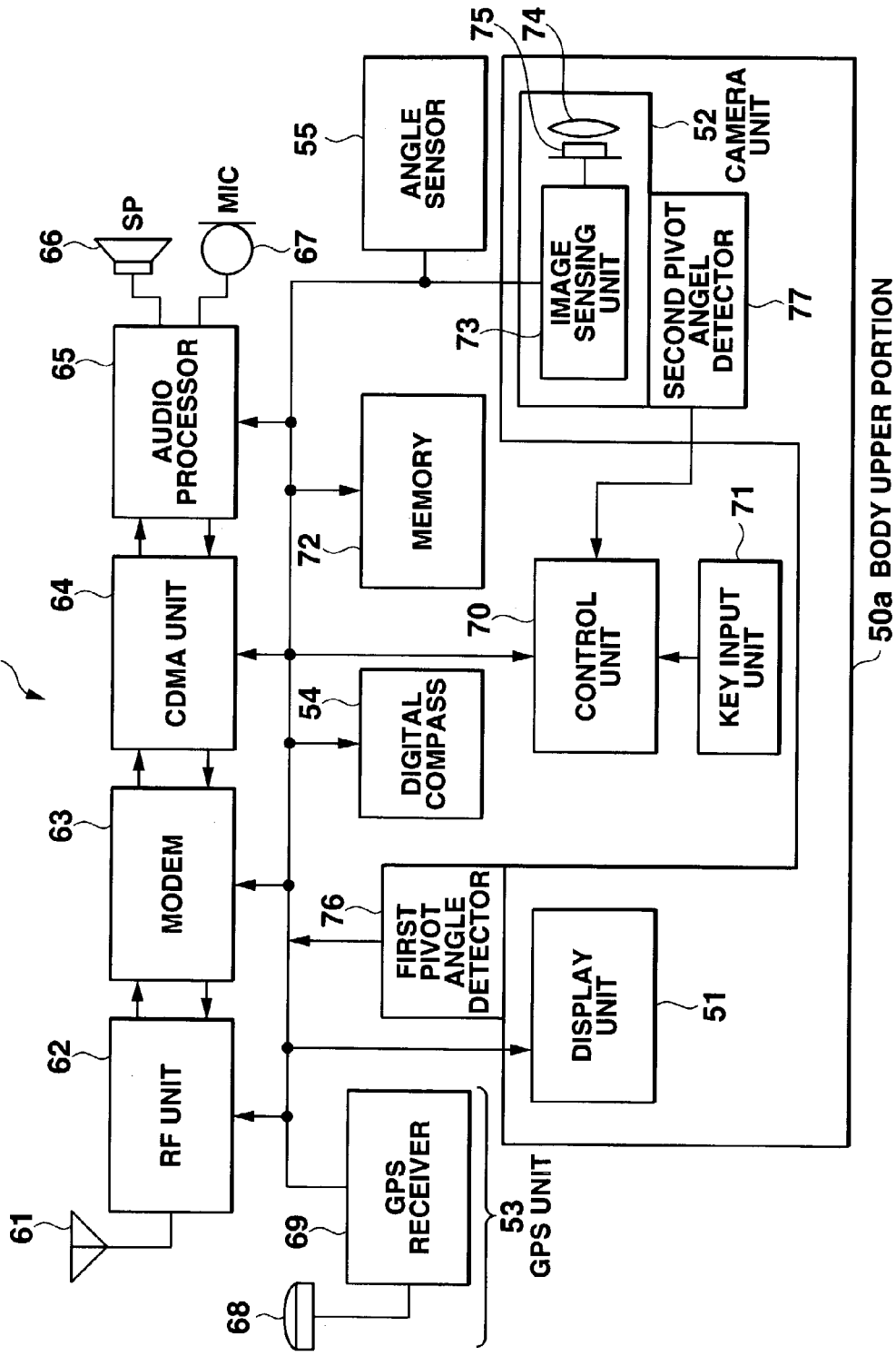
FIG. 8 is a block diagram showing the circuit arrangement of the cellular phone with a camera according to the fourth embodiment of the present invention.

FIG. 8 shows the circuit arrangement of the cellular phone 50. Referring to FIG. 8, reference numeral 61 denotes an antenna used to make communications with a nearby base station. An RF unit 62 is connected to this antenna 61.

Upon reception, the RF unit 62 demultiplexes a signal input from the antenna 61 from the frequency axis using a duplexer. The unit 62 then mixes the demultiplexed signal with a local oscillation signal of a predetermined frequency output from a PLL synthesizer to frequency-convert it into an IF signal. Furthermore, the unit 62 extracts a reception frequency channel alone using a broad-band BPF, and makes the signal level of a desired reception wave constant using an AGC amplifier. Then, the unit 62 outputs the signal to a modem 63.

On the other hand, upon transmission, the RF unit 62 controls the transmission power of an OQPSK (Offset Quadri-Phase Shift Keying) modulated signal sent from the modem 63 using the AGC amplifier under the control of a control unit 70 (to be described later). The unit 62 mixes the modulated signal with a local oscillation signal of a predetermined frequency output from the PLL synthesizer to frequency-convert it into an RF band. The unit 62 then amplifies the converted signal to large power using a PA (Power Amplifier). After that, the unit 62 transmits the amplified signal by radiation from the antenna 61 via the duplexer.

Upon reception, the modem 63 separates the IF signal from the RF unit 62 into a baseband I·Q (In-phase·Quadrature-phase) signal using an orthogonal detector, and converts it into a digital signal at a sample rate of about 10 MHz. Then, the modem 63 outputs the digital signal to a CDMA unit 64.

On the other hand, upon transmission, the modem 63 converts a digital I·Q signal sent from the CDMA unit 64 into an analog signal at a sample rate of about 5 MHz, and OQPSK-modulates the analog signal using the orthogonal detector. Then, the modem 63 outputs the modulated signal to the RF unit 62.

Upon reception, the CDMA unit 64 inputs the digital signal from the modem 63 to a PN (Pseudo Noise) code timing extraction circuit and a plurality of demodulation circuits that make despreading and demodulation in accordance with an instruction from that timing circuit. The unit 64 then synchronously mixes a plurality of demodulated symbols output from these demodulation circuits using a mixer, and outputs the mixed signal to an audio processor 65.

On the other hand, upon transmission, the CDMA unit 64 spreads output symbols from the audio processor 65, and band-limits these symbols using a digital filter to convert them into an I·Q signal. The unit 64 then outputs the I·Q signal to the modem 63.

Upon reception, the audio processor 65 deinterleaves output symbols from the CDMA unit 64, and executes an error correction process using a Viterbi decoder. After that, the processor 65 expands the compressed digital signal to a normal digital audio signal using an audio processing DSP (Digital Signal Processor), converts it into an analog signal, and drives a loudspeaker (SP) 66 to produce a sound.

On the other hand, upon transmission, the audio processor 65 converts an analog audio signal input from a microphone (MIC) 67 into a digital signal, and compresses the digital signal to ⅛ or less using the audio processing DSP. Then, the processor 65 converts the compressed signal into error correction codes using a convolution encoder, and interleaves the converted codes. After that, the processor 65 outputs these output symbols to the CDMA unit 64.

Reference numeral 68 denotes a GPS antenna, to which a GPS receiver 69 is connected.

The GPS receiver 69 forms the GPS unit 53 together with the antenna 68. The GPS receiver 69 demodulates GPS radio waves having a center frequency of 1.57542 GHz received from at least three (preferably, four) GPS satellites via the antenna 68 by despreading their spectrum-spread contents using PN (pseudo noise) codes called C/A codes. The receiver 69 then calculates the current position (latitude/longitude/altitude) on a three-dimensional space and the current time on the basis of these demodulated signals. The receiver 69 outputs the calculation results to the control unit 70.

The control unit 70 is connected to the RF unit 62, modem 63, CDMA unit 64, audio processor 65, and GPS receiver 69. The aforementioned display unit 51, a key input unit 71, the digital compass 54, the angle sensor 55, a memory 72, and an image sensing unit 73 are connected to this control unit 70.

Note that the control unit 70 comprises a CPU, ROM, RAM, and the like, and controls the whole cellular phone on the basis of predetermined operation programs stored in the ROM. The ROM permanently stores the operation programs and the like for the control unit 70, which include various kinds of control required to operate the cellular phone 50 such as communication control, transmission/reception control of communication data, display control on the display unit 51, a navigation program (to be described later), and the like.

Note that a recording medium that stores the programs is not limited to the aforementioned ROM. For example, a magnetic or optical recording medium, a semiconductor memory other than the ROM, a hard disk, a portable recording medium such as a CD-ROM, memory card, or the like, and so forth may be used.

Also, some or all of the programs to be stored in this recording medium may be received via a network. The recording medium may be that of a server developed on the network.

The RAM provided to the control unit 70 has a work area for temporarily storing various data to be processed in the control of the control unit 70, and a phonebook area used to register pairs of destination names and phone numbers. The storage contents of the phonebook area are held irrespective of the power ON state of this cellular phone 50 since that area is backed up by a battery.

The key input unit 71 has dial keys which also serve as character input keys, a "talk" key, an "off" key, a redial key, a mode select key, cursor keys, a shutter key, and the like. The operation signal of each of these keys is directly input to the control unit 70.

The memory 72 is used to store various data and application program which are downloaded via a telephone network (communication network), photographed images obtained by the camera unit 52, and the like.

The image sensing unit 73 forms the camera unit 52 together with an optical lens system 74 and a solid-state image sensing element 75 such as a CCD (Charge Coupled Device) or the like. An optical image of an object, which is formed on the image sensing surface of the solid-state image sensing element 75 by the optical lens system 74, is read out to the image sensing unit 73 in the form of an analog signal. The image sensing unit 73 converts that analog signal into a digital signal, applies a predetermined color process to that digital signal, and outputs the processed signal to the control unit 70.

Note that the pivot angle of the body upper portion 50a with respect to the body lower portion 50b is detected by a first pivot angle detector 76. The first pivot angle detector 76 is provided to a pivot shaft portion of the body lower portion 50b and comprises, e.g., an optical rotary encoder or the like. Also, the pivot angle of the camera unit 52 with respect to the body upper portion 50a is detected by a second pivot angle detector 77. The second pivot angle detector 77 is provided to a pivot shaft portion of the body upper portion 50a and comprises, e.g., an optical rotary encoder or the like.

The operation of this embodiment will be described below.

FIG. 9 shows the processing contents to be executed by the control unit 70 in an image communication (video phone) mode which is set upon making or receiving a call to or from a partner's phone.

At the beginning of this process, a photographing process is executed, and the obtained image data is temporarily held in the RAM (step E01). The pivot state of the body upper portion 50a with respect to the body lower portion 50b is detected by the first pivot angle detector 76, and the pivot state of the camera unit 52 with respect to the body upper portion 50a is detected by the second pivot angle detector 77 at the same time (step E02).

It is then checked based on the detection result of the second pivot angle detector 77 if the camera unit 52 has been pivoted to the surface side where the display unit 51 is arranged (step E03).

Only when it is determined that the camera unit 52 has been pivoted to the surface side, a process for correcting azimuth information obtained by the digital compass 54 (i.e., a process for rewriting the azimuth information to a direction reversed through 180°) is executed (step E04).

Also, a process for correcting angle information obtained by the angle sensor 55 on the basis of the detection results of the first and second angle detectors 76 and 77 is executed (step E05). More specifically, the angles detected by the first and second angle detectors 76 and 77 are added to or subtracted from the angle obtained by the angle sensor 55.

After that, image data, azimuth data, and angle data obtained as the processing results in steps E01 through E05 are transmitted to a partner's phone (or an information terminal such as a personal computer, PDA, or the like), and the flow returns to the processes from step E01 (step E06).

By repeating the processes in steps E01 through E06, images photographed in real time, and photographing azimuths and angles are transmitted to a partner's phone. In this way, a real-time video can be displayed on the monitor of the partner's phone, and the photographing azimuth and angle data can be superimposed on that video.

Upon transmitting data to the partner's phone in step E06, only the azimuth and angle data are transmitted together with image data. However, in practice, audio data input via the microphone (MIC) 67, and position data (latitude and longitude data) at that position obtained by the GPS unit 53 are transmitted to the partner's phone together.

Parallel to the processes in steps E01 through E06, processes for receiving real-time image data, azimuth data, angle data, audio data, position data, and the like, which are sent from the partner's phone, are executed. An image superimposed with information such as an azimuth, angle, position, and the like is displayed on the display unit 51, and a voice is output from the loudspeaker 66.

In the fourth embodiment, image data obtained by the photographing process, azimuth data obtained by the digital compass 54, and angle data obtained by the angle sensor 55 are transmitted to a partner's phone. As in the first to third embodiments, the obtained image data, azimuth data, and angle data may be displayed on the display unit 51 or may be recorded on the memory 72 in association with each other. Also, image data, azimuth data, and angle data, which are recorded on the memory 72 in association with each other, may be transmitted to a partner's communication terminal in response to a user's transmission instruction operation. Furthermore, image data, azimuth data, and angle data obtained in response to the operation of the shutter button may be automatically transmitted to a partner's communication terminal.

In the fourth embodiment, a case has been exemplified wherein the present invention is applied to a cellular phone with a camera, which has two pivotal portions. Also, the present invention can be applied to a cellular phone with a camera, which has one or three or more pivotal portions.

In the fourth embodiment, a case has been exemplified wherein the present invention is applied to a cellular phone with a camera, which has pivotal portions that are pivotal in the up and down directions. Also, the present invention can be applied to a cellular phone with a camera, which has pivotal portions that are pivotal in right and left directions.

In the second and third embodiments, azimuth or angle information detected by the azimuth sensor 33 or angle sensor is corrected as needed, and is superimposed on a through image displayed on the display unit 28 while the control waits for depression of the shutter button. However, when the user of this digital camera 1 need not always recognize the azimuth of the facing direction of the image sensing unit 19, such superimpose display need not always be made. In such case, the azimuth or angle may be detected after the photographing process executed in response to depression of the shutter button, as shown in FIG. 4. As a result, the process in the standby state can be simplified.

In the third embodiment, angle information detected by the angle sensor is corrected as needed, and is recorded on the memory card 31 in association with image data. Alternatively, the angle information may be merely superimposed during display of a through image without being recorded on the memory card 31.

In the first and second embodiments, the azimuth sensor 33 detects an azimuth alone. In the third embodiment, the tilt angle alone is detected. Alternatively, both the azimuth and tilt angle may be detected.

In this case, in place of merely displaying or recording the detected photographing azimuth and angle, an accurate three-dimensional position of an object image may be calculated on the basis of these azimuth and angle, and also the current position information measured by the GPS receiver 32 and the distance to the object image obtained by an AF function. Then, the calculated three-dimensional position information (or information corresponding to the three-dimensional position information) may be displayed on a through image, or may be recorded on the memory card 31 in association with image data.

In the first to third embodiments, the present invention is applied to a digital still camera. In the fourth embodiment, the present invention is applied to a cellular phone with a camera function. However, the present invention is not limited to such specific embodiments, and can also be easily implemented when it is applied to a digital video (movie) camera, a portable information device with a camera function, a notebook type personal computer, and the like.

In addition, the present invention is not limited to the above embodiments, and various modifications may be made without departing from the spirit and scope of the invention.

What is claimed is:

1. A digital camera comprising:
   an image sensing unit which is coupled to a main body unit so as to be pivotable with respect to the main body unit, and which is configured to sense an object image;
   a pivot state detection unit configured to detect a pivot state of the image sensing unit with respect to the main body unit;
   a photographing direction detection unit which is arranged in the main body unit, and which is configured to detect a photographing direction regardless of the pivot state of the image sensing unit detected by the pivot state detection unit; and
   a correction unit configured to correct the photographing direction detected by the photographing direction detection unit, based on the pivot state detected by the pivot state detection unit;
   wherein the photographing direction detection unit comprises a unit configured to detect an azimuth angle, and the correction unit comprises a unit configured to correct the azimuth angle detected by the photographing direction detection unit based on the pivot state detected by the pivot state detection unit.

2. The camera according to claim 1, wherein the pivot state detection unit comprises a unit configured to detect a pivot angle of the image sensing unit with respect to the main body unit.

3. The camera according to claim 2, wherein the correction unit comprises a unit configured to correct the photographing direction by making an addition or subtraction of the pivot angle detected by the pivot state detection unit and the photographing direction detected by the photographing direction detection unit.

4. The camera according to claim 1, wherein the photographing direction detection unit further comprises a unit configured to detect a tilt angle, and the correction unit further comprises a unit configured to correct the tilt angle detected by the photographing direction detection unit based on the pivot state detected by the pivot state detection unit.

5. The camera according to claim 1, further comprising a recording unit configured to record information based on the photographing direction corrected by the correction unit.

6. The camera according to claim 5, wherein the recording unit comprises a unit configured to record image data obtained by the image sensing unit, and the camera further comprises a recording control unit configured to control the recording unit to record the information based on the photographing direction corrected by the correction unit in association with the image data.

7. The camera according to claim 1, further comprising a display unit configured to display information based on the photographing direction corrected by the correction unit.

8. The camera according to claim 7, wherein the display unit comprises a unit configured to display image data obtained by the image sensing unit, and the camera further comprises a display control unit configured to control the display unit to display the information based on the photographing direction corrected by the correction unit together with the image data.

9. The camera according to claim 1, further comprising a transmission unit configured to transmit information based on the photographing direction corrected by the correction unit.

10. The camera according to claim 9, wherein the transmission unit comprises a unit configured to transmit image data obtained by the image sensing unit, and the camera further comprises a transmission control unit configured to control the transmission unit to transmit the information based on the photographing direction corrected by the correction unit together with the image data.

11. The camera according to claim 1, further comprising a determination unit configured to determine, based on the pivot state detected by the pivot state detection unit, whether or not the photographing direction detected by the photographing direction detection unit need be corrected, wherein the correction unit corrects the photographing direction detected by the photographing direction detection unit only if the determination unit determines that the photographing direction need be corrected.

12. The camera according to claim 1, wherein the image sensing unit is pivotable about a plurality of pivot shafts with respect to the main body unit, the pivot state detection unit is configured to detect pivot states of the plurality of pivot shafts, and the correction unit is configured to correct the photographing direction detected by the photographing direction detection unit based on the pivot states of the plurality of pivot shafts detected by the pivot state detection unit.

13. The camera according to claim 1, further comprising a photographing instruction unit configured to instruct to start a photographing operation, wherein the photographing direction detection unit is configured to detect the photographing direction when the photographing instruction unit instructs to start the photographing operation.

14. The camera according to claim 1, further comprising:
   a distance acquisition unit configured to acquire a distance to an object image;
   a position acquisition unit configured to acquire a current position; and
   an object position calculation unit configured to calculate a position of the object image based on the distance to the object image acquired by the distance acquisition unit, the current position acquired by the position acquisition unit, and the photographing direction corrected by the correction unit.

15. A photographing direction acquisition method comprising:
   detecting a pivot state of an image sensing unit, which is coupled to a main body unit so as to be pivotable with respect to the main body unit;
   detecting a photographing direction regardless of the detected pivot state of the image sensing unit, by using a detector provided to the main body unit; and correcting the detected photographing direction based on the detected pivot state of the image sensing unit;

wherein detecting the photographing direction comprises detecting an azimuth angle, and correcting the detected photographing direction comprises correcting the detected azimuth angle based on the detected pivot state of the image sensing unit.

16. A digital camera comprising:

an image sensing unit which is coupled to a main body unit so as to be pivotable with respect to the main body unit, and which is configured to sense an object image;

a pivot state detection unit configured to detect a pivot state of the image sensing unit with respect to the main body unit;

a photographing direction detection unit which is arranged in the main body unit, and which is configured to detect a photographing direction regardless of the pivot state of the image sensing unit detected by the pivot state detection unit; and a correction unit configured to correct the photographing direction detected by the photographing direction detection unit, based on the pivot state detected by the pivot state detection unit;

wherein the pivot state detection unit comprises a unit configured to detect a pivot angle of the image sensing unit with respect to the main body unit; and wherein the correction unit comprises a unit configured to correct the photographing direction by making an addition or subtraction of the pivot angle detected by the pivot state detection unit and the photographing direction detected by the photographing direction detection unit.

17. A photographing direction acquisition method comprising:

detecting a pivot state of an image sensing unit, which is coupled to a main body unit so as to be pivotable with respect to the main body unit;

detecting a photographing direction regardless of the detected pivot state of the image sensing unit, by using a detector provided to the main body unit; and correcting the detected photographing direction based on the detected pivot state of the image sensing unit;

wherein detecting the pivot state of the image sensing unit comprises detecting a pivot angle of the image sensing unit with respect to the main body unit; and wherein correcting the detected photographing direction comprises making an addition or subtraction of the detected pivot angle and the detected photographing direction.

18. A digital camera comprising:

an image sensing unit which is coupled to a main body unit so as to be pivotable with respect to the main body unit, and which is configured to sense an object image;

a pivot state detection unit configured to detect a pivot state of the image sensing unit with respect to the main body unit;

a photographing direction detection unit which is arranged in the main body unit, and which is configured to detect a photographing direction regardless of the pivot state of the image sensing unit detected by the pivot state detection unit; and a correction unit configured to correct the photographing direction detected by the photographing direction detection unit, based on the pivot state detected by the pivot state detection unit;

wherein the photographing direction detection unit comprises a unit configured to detect a tilt angle, and the correction unit comprises a unit configured to correct the tilt angle detected by the photographing direction detection unit based on the pivot state detected by the pivot state detection unit.

19. A photographing direction acquisition method comprising:

detecting a pivot state of an image sensing unit, which is coupled to a main body unit so as to be pivotable with respect to the main body unit;

detecting a photographing direction regardless of the detected pivot state of the image sensing unit, by using a detector provided to the main body unit; and correcting the detected photographing direction based on the detected pivot state of the image sensing unit;

wherein detecting the photographing direction comprises detecting a tilt angle, and correcting the detected photographing direction comprises correcting the tilt angle based on the pivot state detected by the pivot state detection unit.

* * * * *